(No Model.)
J. N. WILLIAMS.
JOURNAL BEARING.
No. 315,103. Patented Apr. 7, 1885.
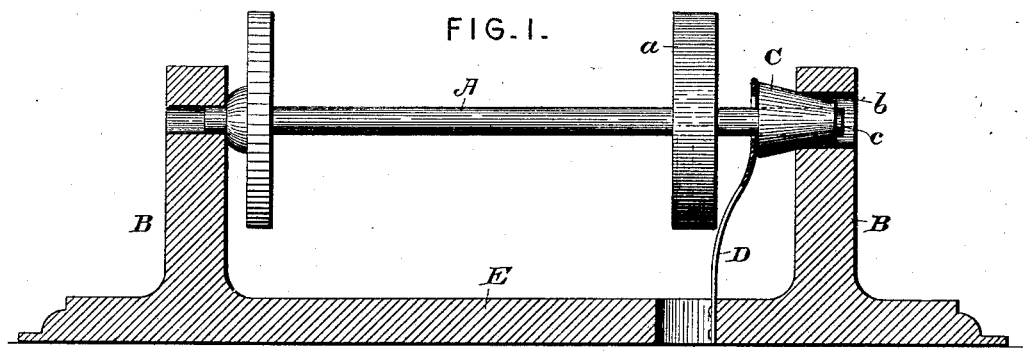
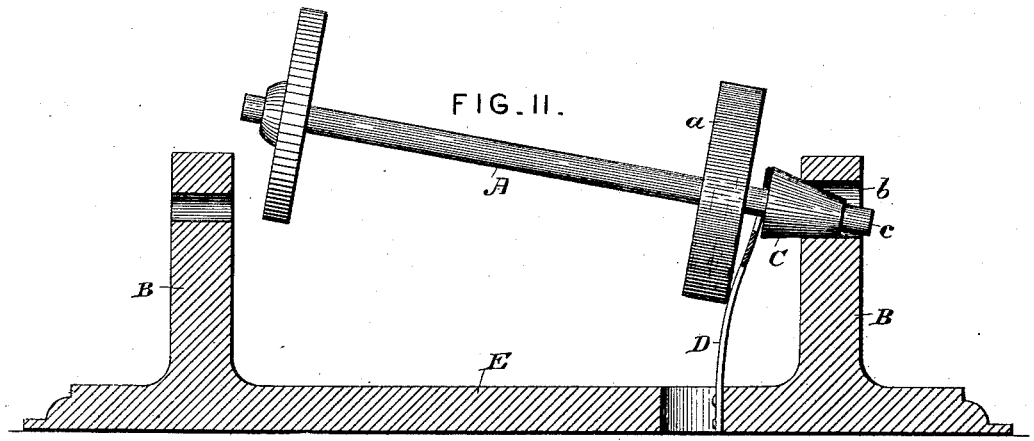
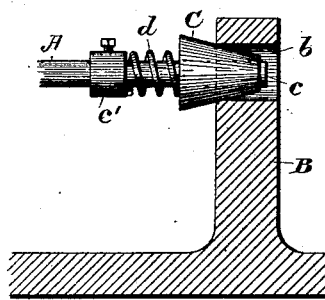
Attest.
Geo. T. Smallwood
Edward Ster
Inventor
John Newton Williams
By Knight Bros.
Attys

UNITED STATES PATENT OFFICE.

JOHN NEWTON WILLIAMS, OF NEW YORK, N. Y.

JOURNAL-BEARING.

SPECIFICATION forming part of Letters Patent No. 315,103, dated April 7, 1885.

Application filed November 20, 1884. (No model.)

*To all whom it may concern:*

Be it known that I, JOHN N. WILLIAMS, a citizen of the United States, and a resident of New York, in the county of New York and State of New York, have invented a new and useful Improvement in Journal-Bearings, of which the following is a specification.

My invention relates to an improvement upon the ordinary method or means for placing a shaft in or removing it from two fixed bearings or closed boxes. Ordinarily in such cases one of the shaft-bearings is of such larger diameter as that after one end of the shaft is placed within the same the shaft may be turned in such a way as that the remaining or opposite end may be placed within its bearings. The space between the end of the shaft and the larger bearing is then taken up by a bushing inserted from the outer side of said bearing, said bushing being keyed or suitably secured within the same.

My improvement consists in providing means whereby a shaft can be readily inserted or removed from fixed bearings or closed boxes, obviating the necessity of using a bushing which is adjusted from the outside of said bearings, and requiring a key, set-screw, or other suitable device to secure said bushing in place.

To this end I employ a self-centering device constructed as follows: On the end of the shaft which is to be adjusted within the larger bearing of the standard or pillow-block is placed a frusto-conical collar or bushing, which is bored axially for the reception of said shaft. Some distance from the said end of the shaft, and secured to or formed with the latter, is a stationary collar or hub of a wheel between which and the frusto-conical bushing is placed a spring, which tends to force the said bushing into the bearing of the standard or pillow-block. Said spring at the same time tends to keep the other end of the shaft in its bearing by pressing against the edge of the wheel on this shaft or against the said collar or hub.

In the accompanying drawings, Figure I is a front elevation, with the pillow-blocks or standards cut away to show the cone-shaped bushing or collar. Fig. II is a similar view showing the shaft being placed in or removed from its journals. Fig. III is a modified form showing a spiral spring interposed between the collar and bushing.

A represents the shaft, which may be provided with the wheel $a$, secured at any desired position on the shaft.

B is a standard or pillow-block having a bearing, $b$. A frusto-conical collar or bushing, C, is placed loosely upon the end $c$ of the shaft A. A spring, D, secured at one end to the frame or base plate E, or other part, is interposed between the wheel $a$ and the collar or bushing C, as shown in Figs. I and II.

When a bar or plate spring is employed, as here shown, it may be bent so as to bear against the periphery of the wheel $a$, and as the said wheel is keyed or fixed to the shaft the tendency of the spring will be to force the shaft into its bearing at one end and the bushing C into its bearing at the other. At the same time it will be observed that the spring D will provide a friction-brake for the wheel $a$, valuable in case any motion of said wheel is to be prevented after the driving force has been withdrawn. Instead of such an arrangement, however, I may employ a collar, $c'$, cast or fixed on the shaft A, or adjustable thereon by set-screw, as shown in Fig. III. In case a fixed collar is employed, a spiral spring, $d$, is preferably used between it and the bushing C for forcing collar and bushing apart, while with an adjustable collar, the spring $d$ may be entirely omitted, the said collar being adjusted to bear closely on the face of bushing C whenever the shaft and bushing are placed in position.

To insert the shaft A the collar or bushing C is placed upon the end $c$ of said shaft, the said end with the collar or bushing C inserted in the bearing $b$, small end first, after which the said shaft A is moved laterally, and the opposite end of said shaft is adjusted in its bearing in the corresponding standard or pillow-block. The tapered or conical form of the bushing C permits the movement of the shaft laterally or radially to a sufficient extent to allow its end to be inserted in or removed from the bearing $b$, while at the same time automatically centering the bearing, by the action of the spring D, (or $d$,) as soon as in position. The shape of the bushing also adapts it to automatically adjust itself to alignment with the shaft, notwithstanding any irregularities in shaft, bushing, or bearing. The shaft is kept in place by means of the spring forcing apart the bushing and the wheel or collar on the shaft.

When it is desired to remove the shaft, it may be moved endwise toward the standard B, and the opposite end of said shaft withdrawn from its bearings, as shown in Fig. II, the necessary radial motion to remove the shaft being then permitted by the conical form of bushing C.

Having thus described my invention, what I claim as new therein, and desire to secure by Letters Patent, is—

1. In combination with a shaft, a fixed hanger or box having a bearing of greater diameter than said shaft, and a movable roller or bushing having an axial bearing for said shaft and tapered externally, substantially as and for the purpose set forth.

2. In combination with a shaft and fixed bearings therefor of a greater diameter than said shaft, a tapering collar or bushing on said shaft, and a spring adapted to press it to its bearing, substantially as set forth.

3. In combination with a shaft, a wheel thereon, fixed bearings for said shaft of greater diameter than the same, a tapering collar or bushing on said shaft, and a spring bearing between said wheel and bushing, substantially as and for the purposes set forth.

4. The combination of the shaft suitably supported at one end and at the other end provided with a collar attached thereto, with the standard, the cone-shaped bushing, and the interposed spring which bears against the collar and bushing, as and for the purposes set forth.

J. NEWTON WILLIAMS.

Witnesses:
CHARLES C. BULKLEY,
HERBERT KNIGHT.